United States Patent
Cheon et al.

(10) Patent No.: US 7,838,152 B2
(45) Date of Patent: Nov. 23, 2010

(54) CONDUCTIVE AGENT-POSITIVE ACTIVE MATERIAL COMPOSITE FOR LITHIUM SECONDARY BATTERY, METHOD OF PREPARING THE SAME, AND POSITIVE ELECTRODE AND LITHIUM SECONDARY BATTERY COMPRISING THE SAME

(75) Inventors: Sang-Eun Cheon, Suwon-si (KR);
Seok-Yoon Yoo, Suwon-si (KR);
Hye-Won Yoon, Suwon-si (KR);
Jae-Kyung Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 938 days.

(21) Appl. No.: 11/258,731

(22) Filed: Oct. 25, 2005

(65) Prior Publication Data

US 2006/0093920 A1   May 4, 2006

(30) Foreign Application Priority Data

Oct. 28, 2004   (KR)   ...................... 10-2004-0086630

(51) Int. Cl.
*H01M 4/60*   (2006.01)
*H01M 4/525*   (2006.01)

(52) U.S. Cl. .................. 429/232; 429/231.3; 429/231.5

(58) Field of Classification Search ............... 429/231.1, 429/231.3, 231.5, 232
See application file for complete search history.

(56) References Cited

U.S. PATENT DOCUMENTS

| | | | |
|---|---|---|---|
| 6,727,020 B2 * | 4/2004 | Heider et al. | 429/232 X |
| 6,746,799 B2 * | 6/2004 | Yamada et al. | 429/231.1 X |
| 6,828,064 B1 * | 12/2004 | Nardi | 429/232 |
| 2003/0068555 A1 | 4/2003 | Naruoka | |
| 2003/0165739 A1 | 9/2003 | Kizu et al. | |

FOREIGN PATENT DOCUMENTS

| | | |
|---|---|---|
| CN | 1430796 A | 7/2003 |
| EP | 0 987 779 | 3/2000 |
| EP | 1 265 302 | 12/2002 |
| JP | 60-258860 | 12/1985 |
| JP | 11-154515 | 6/1999 |
| JP | 2001-68093 | 3/2001 |
| JP | 2001-185218 | 7/2001 |

(Continued)

OTHER PUBLICATIONS

European Search Report, dated Jan. 4, 2006, for Application No. 05110064.2, in the name of Samsung SDI Co., Ltd.

(Continued)

*Primary Examiner*—Stephen J. Kalafut
(74) *Attorney, Agent, or Firm*—Christie, Parker & Hale, LLP (57) ABSTRACT

The present invention relates to a conductive agent/positive active material composite for a lithium secondary battery. The composite includes a positive active material capable of reversibly intercalating/deintercalating lithium ions, and a conductive agent on the surface of the positive active material. The conductive agent comprises a first conductive agent having a specific surface area ranging from about 200 to about 1500 $m^2/g$ and a second conductive agent having a specific surface area of about 100 $m^2/g$ or less.

37 Claims, 8 Drawing Sheets

FOREIGN PATENT DOCUMENTS

| | | |
|---|---|---|
| JP | 2003-086174 | 3/2003 |
| JP | 2003-123764 | 4/2003 |
| JP | 2003-234099 | 8/2003 |
| JP | 2004-207034 | 7/2004 |

OTHER PUBLICATIONS

EPO Patent Abstracts of Japan for Publication No. 60258860, Publication date Dec. 20, 1985, in the name of Kaoru Murakami.

EPO Patent Abstracts of Japan for Publication No. 2004207034; Publication date Jul. 22, 2004, in the name of Shinya Miyazaki.

EPO Patent Abstracts of Japan for Publication No. 2001185218; Publication date Jul. 1, 2006, in the name of Itaru Gosho.

EPO Patent Abstracts of Japan for Publication No. 2001068093; Publication date Mar. 16, 2001, in the name of Takeshi Moriuchi.

EPO Patent Abstracts of Japan for Publication No. 2003234099; Publication date Aug. 22, 2003, in the name of Yuko Ishida.

EPO Patent Abstracts of Japan for Publication No. 2003123764; Publication date Apr. 25, 2003, in the name of Keiichi Hayashi.

* cited by examiner

CONDUCTIVE AGENT-POSITIVE ACTIVE MATERIAL COMPOSITE FOR LITHIUM SECONDARY BATTERY, METHOD OF PREPARING THE SAME, AND POSITIVE ELECTRODE AND LITHIUM SECONDARY BATTERY COMPRISING THE SAME

CROSS REFERENCE TO RELATED APPLICATION

This application claims priority to and the benefit of Korean Patent Application No. 10-2004-0086630 filed in the Korean Intellectual Property Office on Oct. 28, 2004, the entire content of which is incorporated herein by reference.

FIELD OF THE INVENTION

The present invention relates to a conductive agent/positive active material composite, a method of preparing the same, and a positive electrode and a lithium secondary battery comprising the same. More particularly, the present invention relates to a conductive agent/positive active material composite for a lithium secondary battery that reduces the resistance of a positive electrode and increases the active mass density of the electrode.

BACKGROUND OF THE INVENTION

Recently, portable electronic equipment have become smaller and lighter but have increased in capacity. In light of this, a need has developed for batteries having improved performance for use in these portable electronic devices. Such batteries must be produced cost-effectively manner and be reliable and safe. To satisfy this need, lithium secondary batteries have been developed. These lithium batteries are classified as lithium sulfur batteries, which use sulfur-based materials as the positive active material, and lithium ion batteries, which use lithiated transition metal oxides as the positive active material.

The positive active material is a main component of the lithium secondary battery and is major factor affecting the performance and safety of the battery. The positive active material typically comprises a chalcogenide compound, e.g. a metal oxide complex such as $LiCoO_2$, $LiMn_2O_4$, $LiNiO_2$, $LiNi_{1-x}Co_xO_2$ (0<x<1), and $LiMnO_2$. The positive active material is mixed with a conductive material such as carbon black, a binder, and a solvent to provide a slurry composition. The slurry composition is then coated on a thin metal plate such as aluminum foil to provide a positive electrode for a lithium ion secondary battery.

Among the above positive active materials, manganese-based materials such as $LiMn_2O_4$ and $LiMnO_2$ are easier to prepare and less expensive than the other materials. Manganese-based materials are also are environmentally friendly. However, manganese-based materials have relatively low capacity. In contrast, cobalt-based materials such as $LiCoO_2$ and $LiCoO_2$ are relatively expensive, but are have good electrical conductivity and high cell voltage. For this reason, cobalt-based materials are widely used. Nickel-based materials such as $LiNiO_2$ are inexpensive and have high capacity, but are difficult to form into a desired structure and are less stable in the charged state, causing battery safety problems.

While conventional positive active materials mainly comprise Co-based positive active materials, high capacity Ni-based positive active materials have recently been used to prepare high capacity batteries. However, since Ni-based positive active materials are spherical in shape, the electrode plate can only be fabricated with a maximum density of the active mass (a mixture of the positive active material, a binder, and a conductive agent) of just 3.2 g/cc. The electrode plate is generally fabricated by pressing in order to increase the density of the active mass. The active material powders are compressed to provide an electrode plate having a high density of the active mass by sliding. However, as Ni-based positive active materials have low hardness, these powders do not slide and break from the compression and the density of the active mass therefore does not increase. Accordingly, even though the active material itself has a high capacity, the density of the active mass is too low to provide a high capacity battery.

SUMMARY OF THE INVENTION

In one embodiment of the present invention, a conductive agent/positive active material composite for a lithium secondary battery reduces the resistance of a positive electrode and increases the active mass density of the electrode.

According to another embodiment of the present invention, a method for preparing a conductive agent/positive active material composite for a lithium secondary battery is provided.

According to another embodiment of the present invention, a positive electrode comprises a conductive agent/positive active material composite which reduces the resistance of a positive electrode and increases the active mass density of the electrode.

According to another embodiment of the present invention, a lithium secondary battery comprises a positive electrode which includes a conductive agent/positive active material composite which reduces the resistance of a positive electrode and increases the active mass density of the electrode.

A conductive agent/positive active material composite for a lithium secondary battery according to one embodiment of the present invention includes a positive active material capable of reversibly intercalating/deintercalating lithium ions, and a conductive agent on the surface of the positive active material. The conductive agent includes a first conductive agent having a specific surface area ranging from about 200 to about 1500 $m^2/g$, and a second conductive agent having a specific surface area of about 100 $m^2/g$ or less.

A method of preparing the conductive agent/positive active material composite includes first mixing a first conductive agent with a second conductive agent. The mixture is then coated on a surface of the positive active material to form a conductive layer. The mixture may be coated by any suitable means, for example mechanofusion, planetary mixing or kneading.

In one embodiment, a positive electrode for a lithium secondary battery comprises a conductive agent/positive active material composite and a binder. The conductive agent/positive active material composite includes a positive active material capable of reversibly intercalating/deintercalating lithium ions, and a conductive agent on the surface of the positive active material. The conductive agent includes a first conductive agent having a specific surface area ranging from about 200 to about 1500 $m^2/g$ and a second conductive agent having a specific surface area of about 100 $m^2/g$ or less.

A lithium secondary battery according to one embodiment of the present invention includes a positive electrode having a conductive agent/positive active material composite, a negative electrode having a negative active material capable of intercalating and deintercalating lithium ions, and an electrolyte.

BRIEF DESCRIPTION OF THE DRAWINGS

The above and other features and advantages of the present invention will be become more apparent by reference to the following detailed description when considered in conjunction with the accompanying drawings, wherein.

DETAILED DESCRIPTION OF THE INVENTION

A conventional positive electrode typically comprises a positive active material coated with a conductive agent. This improves electron conductivity of the positive active material and increases the amount of conductive agent (carbon) in the positive electrode. However, the electron conductivity can decrease rapidly, necessitating the use of more conductive agent in the slurry to improve electron conductivity. Also, more positive active material should be used in order to increase the density of the active mass.

On the other hand, according to the present invention, the positive active material is coated with two or more conductive agents to provide a conductive agent/active material composite. This composite has reduced resistance and increased density of the active mass of the positive electrode.

The conductive agent/positive active material composite according to one embodiment of the present invention includes a positive active material capable of reversibly intercalating/deintercalating lithium ions, and a conductive agent on the surface of the positive active material. The conductive agent includes a first conductive agent having a specific surface area ranging from about 200 to about 1500 $m^2/g$ and a second conductive agent having a specific surface area of about 100 $m^2/g$ or less. In another embodiment, the conductive agent includes a first conductive agent having a specific surface area ranging from about 700 to about 1200 $m^2/g$ and a second conductive agent having a specific surface area ranging from about 40 to about 80 $m^2/g$. If the specific surface area of the first conductive agent is greater than about 1500 $m^2/g$ and the specific surface area of the second conductive agent is greater than about 100 $m^2/g$, the density of the active mass decreases, the amount of the conductive agent per unit volume decreases and the amount of conductive agent adjacent to the positive active material decreases. As a result, the number of pathways for providing electrons decreases and the electrochemical properties of the battery deteriorate. Further, if the specific surface areas of the first and second conductive agents too low the tap density increases, thereby decreasing the amount of electrolyte that contacts the positive electrode.

The first conductive agent has a tap density ranging from about 0.02 to about 0.1 g/cc. In another embodiment, the first conductive agent has a tap density ranging from about 0.05 to about 0.09 g/cc. The second conductive agent has a tap density ranging from about 0.1 to about 1 g/cc. In another embodiment, the second conductive agent has a tap density ranging from about 0.2 to about 0.5 g/cc. When the tap density of the first conductive agent is less than about 0.02 g/cc and the tap density of the second conductive agent is less than about 0.1 g/cc, the composite cannot be mixed well. When the tap density of the first conductive agent is more than about 0.1 g/cc and the tap density of the second conductive agent is more than about 1 g/cc, the conductive layer is too dense, resulting in decreased electrolyte immersion or separation of the conductive layer from the active material due to volume expansion of the conductive layer after immersion of the electrolyte.

In one embodiment, the first conductive agent is selected from the group consisting of Ketjen black (manufactured by Ketjen Intl., Japan), Vulcan black (XC72®, manufactured by Cabot Company), Printex (XE 2b®, a type of carbon black manufactured by DeGussa Company), black pearl (2000®, manufactured by Cabot Company) and mixtures thereof. In another embodiment, the first conductive agent comprises Ketjen Black.

In one embodiment, the second conductive agent is selected from the group consisting of Super-P (a type of carbon black manufactured by MMM Carbon Company), acetylene black (i.e. AB100®, manufactured by CP Chem.), denka black (100P® or HS100®, manufactured by Denka Company), carbon black and mixtures thereof. In another embodiment, the second conductive agent is selected from the group consisting of Super-P, acetylene black and mixtures thereof.

In one embodiment, a weight ratio of the first conductive agent to the second conductive agent ranges from about 25:75 to about 75:25. In another embodiment, the weight ratio ranges from about 50:50 to about 60:40. When the weight ratio is less than 25:75, the specific surface area is reduced, thereby decreasing electro-conductivity. When the weight ratio is more than 75:25, the specific surface area increases, thereby reducing the density of the active mass.

The positive active material comprises a compound capable of reversibly intercalating and deintercalating lithium ions, i.e. lithiated intercalation compounds. Nonlimiting examples of such compounds include at least one selected from the group consisting of compounds represented by formulas 1 to 18.

$$LiNiO_2 \quad (1)$$

$$LiCoO_2 \quad (2)$$

$$LiMnO_2 \quad (3)$$

$$LiMn_2O_4 \quad (4)$$

$$Li_aNi_bB_cM_dO_2 \quad (5)$$

(wherein $0.90 \leq a \leq 1.1$, $0 \leq b \leq 0.9$, $0 \leq c \leq 0.5$, $0.001 \leq d \leq 0.1$)

$$Li_aNi_bCo_cMn_dM_eO_2 \quad (6)$$

(wherein $0.90 \leq a \leq 1.1$, $0 \leq b \leq 0.9$, $0 \leq c \leq 0.5$, $0 \leq d \leq 0.5$, $0.001 \leq e \leq 0.1$)

$$Li_aNiM_bO_2 \quad (7)$$

($0.90 \leq a \leq 1.1$, $0.001 \leq b \leq 0.1$)

$$Li_aCoM_bO_2 \quad (8)$$

($0.90 \leq a \leq 1.1$, $0.001 \leq b \leq 0.1$)

$$Li_aMnM_bO_2 \quad (9)$$

($0.90 \leq a \leq 1.1$, $0.001 \leq b \leq 0.1$)

$$Li_aMn_2M_bO_4 \quad (10)$$

($0.90 \leq a \leq 1.1$, $0.001 \leq b \leq 0.1$)

$$DS_2 \quad (11)$$

$$LiDS_2 \quad (12)$$

$$V_2O_5 \quad (13)$$

$$LiV_2O_5 \quad (14)$$

$$LiEO_2 \quad (15)$$

$$LiNiVO_4 \quad (16)$$

$$Li_{(3-x)}F_2(PO_4)_3 (0 \leq x \leq 3) \quad (17)$$

$$Li_{(3-x)}Fe_2(PO_4)_3 (0 \leq x \leq 2) \quad (18)$$

(wherein B is Co or Mn;
D is Ti or Mo;
E is selected from the group consisting of Cr, V, Fe, Sc, and Y;
F is selected from the group consisting of V, Cr, Mn, Co, Ni, and Cu; and
M is at least one transition metal or lanthanide selected from the group consisting of Al, Cr, Mn, Fe, Mg, La, Ce, Sr, and V). In one embodiment, the positive active material is selected from the group consisting of lithium cobalt oxide, lithium nickel oxide, and lithium manganese oxide.

In one embodiment, a weight ratio of the conductive agent to the positive active material of the composite ranges from about 3:97 to about 20:80. In another embodiment, the weight ratio ranges from about 5:95 to about 15:85. When the weight ratio is less than 3:97, the amount of conductive agent is insufficient, thereby decreasing battery power. When the weight ratio is more than 20:80, the conductive agent and the active material are not well mixed, thereby reducing the energy density of the battery.

In one embodiment, the conductive agent/positive active material composite has a specific surface area ranging from about 10 to about 200 m²/g. In another embodiment, the specific surface area ranges from about 20 to about 200 m²/g. In yet another embodiment, the specific surface area ranges from about 30 to about 120 m²/g. In still another embodiment, the specific surface area ranges from about 40 to about 60 m²/g. When the specific surface area of the composite is more than about 200 m²/g, good dispersion is not achieved during mixing of the slurry. When the specific surface area is less than about 10 m²/g, sufficient improvement of the electrochemical properties is not obtained.

In one embodiment, the composite has a tap density ranging from about 0.5 to about 5 g/cc. In another embodiment, the composite has a tap density ranging from about 1 to about 4 g/cc. In still another embodiment, the composite has a tap density ranging from about 1.5 to about 3 g/cc. When the composite has a tap density within these ranges, electrochemical properties are sufficiently improved. When the tap density of the composite is less than about 0.5 g/cc, good dispersion is not achieved during mixing of the slurry. When the tap density is more than 5 g/cc, electrolyte immersion is decreased due to the increased electrode density.

In one embodiment, the conductive agent layer of the conductive agent/positive active material composite has a thickness of about 5 μm or greater. In another embodiment, the thickness ranges from about 7 to about 10 μM. A thicker conductive agent layer favorably increases the amount of carbon conductive agent in the positive electrode.

In another embodiment of the present invention, a method of preparing the conductive agent/positive active material composite is provided. According to this method, the conductive agent/positive active material composite is prepared by first mixing a first conductive agent and a second conductive agent and coating the mixture on the surface of a positive active material to provide a conductive layer. The mixture is coated on the positive active material by a method selected from the group consisting of mechanofusion, planetary mixing and kneading. In one embodiment, the mixture is coated on the positive active material by mechanofusion.

Mechanofusion yields a dry mixture by physically revolving and electrostatically binding the components of the mixture. During mechanofusion, the conductive agent forms around the positive active material to provide a conductive layer. The thickness of the conductive layer depends on the properties of the conductive agent. A conventional conductive layer comprising only Ketjen black has an average thickness of less than 5 μm. However, the conductive layer according to one embodiment of the present invention has an average thickness of 5 μm or more. In another embodiment, the thickness of the conductive layer ranges from about 7 to about 10 μm. The thicker the conductive layer, the greater the amount of carbon accumulated on the positive electrode, thereby increasing electron conductivity and improving power output to create a high power battery.

Further, a conventional composite is typically formed by simply mixing a conductive agent and the active material. In contrast, the composite of the present invention is prepared by coating the active material with the conductive agent by, for example, mechanofusion. The inventive method increases the concentration of the conductive agent on the surface of the active material. The first conductive agent, second conductive agent, and positive active material of the conductive agent/positive active material composite are the same as described above.

In another embodiment of the present invention, a positive electrode for a lithium secondary battery comprises the inventive conductive agent/positive active material composite. More specifically, the positive electrode of a secondary battery includes a conductive agent/positive active material composite and a binder. The conductive agent/positive active material composite includes a positive active material capable of reversible intercalation/deintercalation of lithium ions, and a conductive agent on the surface of the positive active material. The conductive agent includes a first conductive agent having a specific surface area ranging from about 200 to about 1500 m$^2$/g and a second conductive agent having a specific surface area less than or equal to about 100 m$^2$/g. The positive active material, the first conductive agent, and the second conductive agent are the same as described above.

The binder can comprise any binder generally used in lithium secondary batteries. Nonlimiting examples include polyvinylidenefluoride, polytetrafluoroethylene, polyvinylchloride, polyvinylpyrrolidone, and mixtures thereof.

According to one embodiment of the present invention, the positive electrode for the lithium secondary battery is prepared by adding a binder to the above-described conductive agent/positive active material composite. No further conductive agent is needed upon mixing the slurry for the electrode plate, thereby reducing the amount of conductive agent in the electrode plate and reducing electrical resistance of the positive electrode which results from contact with the nonconductive binder.

In one embodiment the weight ratio of the binder to the composite ranges from about 2:98 to about 10:90. In another embodiment, the weight ratio ranges from about 3:97 to about 5:95. If the weight ratio is less than about 2:98, the binding property is insufficient to laminate the conductive layer. On the other hand, if the weight ratio is greater than about 10:90, the excess binder reduces electron conductivity and decreases power.

In one embodiment, the positive electrode has an active mass density ranging from about 1.0 to about 2.4 g/cc. In another embodiment, the positive electrode has an active mass density ranging from about 1.3 to about 1.8 g/cc. The active mass density is the density of the active material layer coated on the current collector.

According to one embodiment of the present invention, the positive electrode for the lithium secondary battery comprises two conductive agents and a positive active material and has an active mass density of about 1.8 g/cc, which is superior to a positive electrode comprising only one conductive agent, which has an active mass density of approximately 1.6 g/cc. In addition, using two conductive agents allows the positive active material to control the microstructure to achieve uniform immersion of the electrolyte. The electrolyte therefore uniformly contacts the positive active material, thereby providing a uniform electrochemical reaction and improving the cycle-life characteristics of the battery.

In another embodiment of the present invention, a lithium secondary battery comprises the inventive positive electrode, a negative electrode comprising a negative active material capable of intercalating and deintercalating lithium ions, and an electrolyte. The negative active material is capable of reversible intercalation and deintercalation of lithium ions and is selected from the group consisting of crystalline or amorphous carbon, carbon-containing complexes, lithium metals, or lithium-containing alloys.

The electrolyte includes a lithium salt and a non-aqueous organic solvent. The lithium salt supplies lithium ions in the battery, making the basic operation of the lithium battery possible and improving the movement of lithium ions between the positive and negative electrodes. The lithium salt is a supporting salt selected from the group consisting of LiPF$_6$, LiBF$_4$, LiSbF$_6$, LiAsF$_6$, LiClO$_4$, LiCF$_3$SO$_3$, LiN(CF$_3$SO$_2$)$_3$, Li(CF$_3$SO$_2$)$_2$N, LiC$_4$F$_9$SO$_3$, LiAlO$_4$, LiAlCl$_4$, LiN(C$_x$F$_{2x+1}$SO$_2$)(C$_y$F$_{2y+1}$) (wherein x and y are natural numbers), LiCl, LiI and mixtures thereof. The concentration of the lithium salt ranges from about 0.8 to about 1.4 M. When the concentration of the lithium salt is less than about 0.8 M, electrolyte performance deteriorates due to decreased ionic conductivity. When the concentration of the lithium salt is greater than about 1.4 M, lithium ion mobility decreases due to increased electrolyte viscosity.

The non-aqueous organic solvent serves as a medium for mobilizing the ions capable of participating in the electrochemical reaction. Nonlimiting examples of suitable non-aqueous organic solvents include carbonates, esters, ethers and ketones. Nonlimiting examples of suitable carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Nonlimiting examples of suitable esters include n-methyl acetate, n-ethyl acetate, n-propyl acetate, and the like. A nonlimiting example of a suitable ether is dibutyl ether, and a nonlimiting example of a suitable ketone is polymethylvinyl ketone.

The non-aqueous organic solvent can comprise a mixture of chain carbonates and cyclic carbonates. In one embodiment, the volume ratio of cyclic carbonates to chain carbonates ranges from about 1:1 to 1:9. When the volume ratio of cyclic carbonates to chain carbonates is within this range, and the mixture is used as an electrolyte, electrolyte performance is enhanced.

In another embodiment, the electrolyte includes a mixture of carbonate solvents and aromatic hydrocarbon solvents. The aromatic hydrocarbon solvents include compounds represented by Formula 1:

(1)

In Formula 1, R1 is selected from the group consisting of halogens, C$_1$ to C$_{10}$ alkyls and mixtures thereof, and q is an integer ranging from 0 to 6.

Nonlimiting examples of suitable aromatic hydrocarbon solvents include benzene, fluorobenzene, toluene, fluorotoluene, trifluorotoluene and xylene. The volume ratio of carbonate solvents to aromatic hydrocarbon solvents ranges from about 1:1 to about 30:1. When the volume ratio of carbonate solvents to aromatic hydrocarbon solvents is within this range, and the mixture is used as an electrolyte, electrolyte performance is enhanced.

Figure 1:
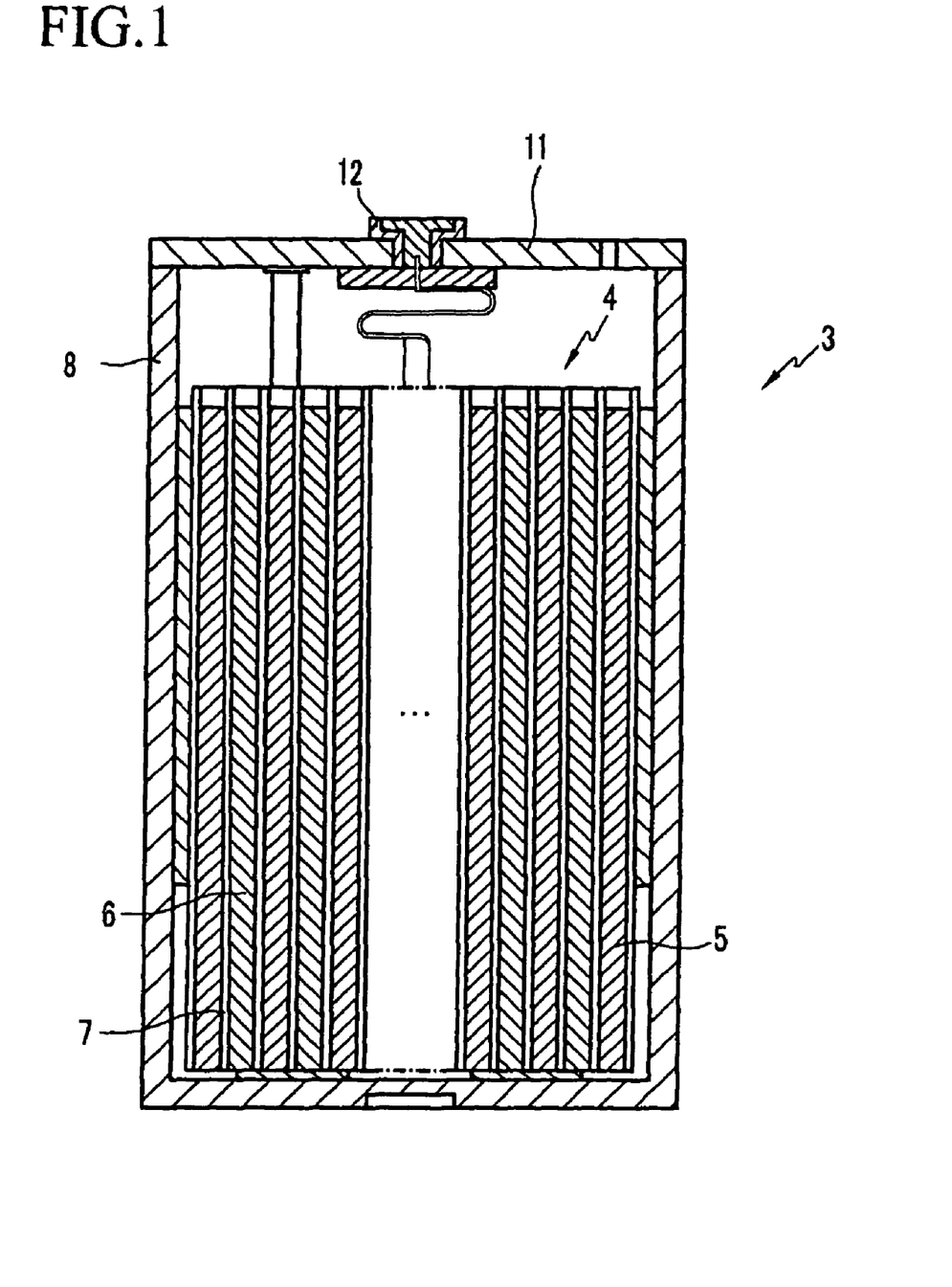
FIG. 1 is a cross-sectional view of a lithium secondary battery according to one embodiment of the present invention.

FIG. 1 is a cross-sectional view of a prismatic lithium ion battery according to one embodiment of the present invention. As shown, the battery 3 includes an electrode assembly 4 comprising a positive electrode 5, a negative electrode 6, and a separator 7 positioned between the positive electrode 5 and the negative electrode 6. To fabricate the battery 3, the electrode assembly 4 is inserted into a battery case 8 and an electrolyte is injected into the battery 3 through the case 8. The battery 3 is then sealed with a cap plate 11 and gasket 12. It is understood that the lithium secondary battery according to the present invention is not limited to the shape shown in FIG. 1 and can take any suitable shape, such as a cylinder or a pouch.

The lithium secondary batteries according to the present invention comprise positive electrodes having high active mass densities and therefore exhibit high battery capacity. Accordingly, the inventive batteries can be used as energy sources for driving motors of hybrid electric vehicles (HEV), electric vehicles (EV), wireless cleaners, motorbikes and motor scooters, all of which require high power.

The following examples further illustrate the present invention in detail. These examples are illustrative in nature and nonlimiting.

EXAMPLES

Comparative Example 1

200 g Ketjen black (average specific surface area of 1417 $m^2/g$, tap density of 0.06 g/cc) was introduced into a mechanofusion machine (HOSOKAWA Company) with 1800 g lithium nickel cobalt aluminum oxide ($LiNi_{0.81}Co_{0.15}Al_{0.04}O_2$) and subjected to mechanofusion at 2000 rpm for 90 minutes after loading at 10 kW to provide a conductive agent/positive active material composite.

Comparative Example 2

A conductive agent/positive active material composite was prepared as in Comparative Example 1, except that 200 g Super P (manufactured by MMM carbon Company) (average specific surface area of 66.59 $m^2/g$, tap density of 0.16 g/cc) was used instead of the Ketjen black.

Comparative Example 3

200 g Ketjen black (average specific surface area of 1417 $m^2/g$, tap density of 0.06 g/cc) was mixed with 1800 g lithium nickel cobalt aluminum oxide ($LiNi_{0.81}Co_{0.15}Al_{0.04}O_2$) to provide a conductive agent/positive active material composite.

Comparative Example 4

Ketjen black (average specific surface area of 1417 $m^2/g$, tap density of 0.06 g/cc) and Super P (manufactured by MMM carbon Company) (average specific surface area of 66.59 $m^2/g$, tap density of 0.16 g/cc) were mixed. The weight ratio of Ketjen Black to Super P was 50:50. The mixture was then mixed with 1800 g lithium nickel cobalt aluminum oxide ($LiNi_{0.81}Co_{0.15}Al_{0.04}O_2$) to prepare a conductive agent/positive active material composite.

Example 1

Ketjen black (average specific surface of 1417 $m^2/g$, tap density of 0.06 g/cc) and Super P (manufactured by MMM carbon Company) (average specific surface area of 66.59 $m^2/g$, tap density of 0.12 g/cc) were mixed. The weight ratio of Ketjen black to Super P was 25:75. The mixture was then introduced into a mechanofusion machine (manufactured by HOSOKAWA Company) along with 1800 g $LiNi_{0.81}Co_{0.15}Al_{0.04}O_2$. The contents of the mechanofusion machine was then subjected to mechanofusion at 2000 rpm for 90 minutes after loading at 10 kW to provide a composite. The resulting composite had a mixed weight ratio of positive active material to conductive agent of 95:5.

Example 2

A composite was prepared as in Example 1, except that the weight ratio of Ketjen black (average specific surface area of 1417 $m^2/g$, tap density of 0.06 g/cc) to Super P (manufactured by MMM carbon Company) (average specific surface area of 66.59 $m^2/g$, tap density of 0.12 g/cc) was 75:25.

Example 3

A composite was prepared as in Example 1, except that the weight ratio of Ketjen black (average specific surface area of 1417 $m^2/g$, tap density of 0.06 g/cc) to Super P (manufactured by MMM carbon Company) (average specific surface area of 66.59 $m^2/g$, tap density of 0.12 g/cc) was 50:50.

Example 4

A composite was prepared as in Example 1, except that Ketjen black (average specific surface area of 254 $m^2/g$, tap density of 0.09 g/cc) was mixed with acetylene black (AB100, manufactured by CP chem) (average specific surface area of 75 $m^2/g$, tap density of 0.2 g/cc). The weight ratio of Ketjen black to acetylene black was 50:50.

Performance Evaluation of Positive Active Materials

FIGS. 2A, 2B, 2C and 2D are Scanning Electron Microscope (SEM) photographs of cross-sections of the composites prepared according to Comparative Example 1, Example 1, Example 2 and Example 3, respectively. The composite prepared according to Comparative Example 1 was treated only with Ketjen black. The composites prepared according to Examples 1 through 3, however, were treated with different mixtures of Ketjen black and Super P.

As shown in FIGS. 2A, 2B, 2C and 2D, the degree of mechanofusion depends on the properties of the conductive agents. The conductive layer of the composite prepared according to Comparative Example 1 is only 3.8 μm thick. In contrast, the conductive layers of the composites prepared according to Examples 1, 2 and 3, comprising two conductive agents, are 7 μm, 8 μm and 10 μm, respectively. The average thickness of the conductive layers of Examples 1, 2 and 3 is more than 5 μm. The composites of Examples 1, 2 and 3, in which two conductive agents were used to form thick conductive layers, have increased amounts of conductive agent on the positive electrode and exhibit improved electro-conductivity and power output, making these composites suitable for high power batteries.

Figure 3A:
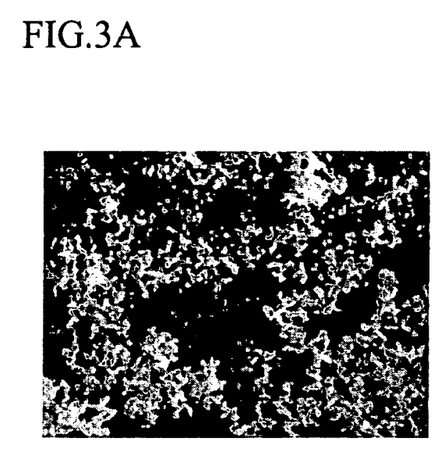
FIG. 3A is a Scanning Electron Microscope (SEM) photograph showing the distribution of conductive agents in a composite prepared according to Comparative Example 1.
Figure 3B:
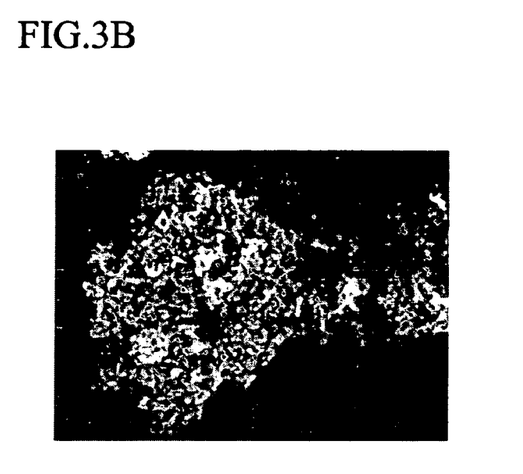
FIG. 3B is a Scanning Electron Microscope (SEM) photograph showing the distribution of conductive agents in a composite prepared according to Comparative Example 2.
Figure 4A:
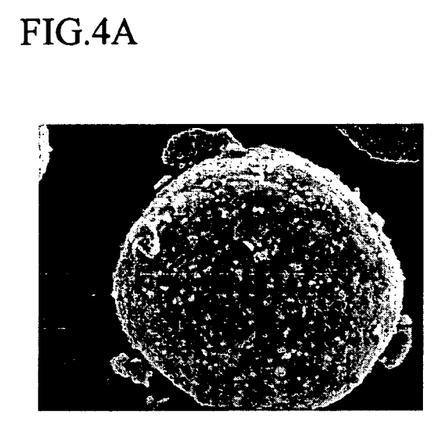
FIG. 4A is a Scanning Electron Microscope (SEM) photograph of a surface of the composite prepared according to Comparative Example 1.
Figure 4B:
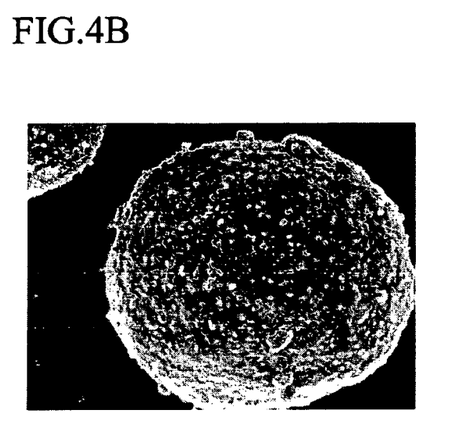
FIG. 4B is a Scanning Electron Microscope (SEM) photograph of a surface of the composite prepared according to Example 1.
Figure 4C:
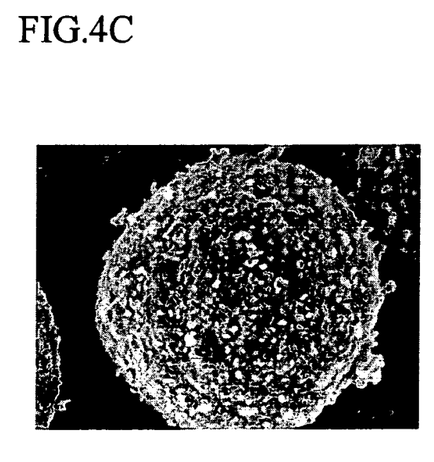
FIG. 4C is a Scanning Electron Microscope (SEM) photograph of a surface of the composite prepared according to Example 2.
Figure 4D:
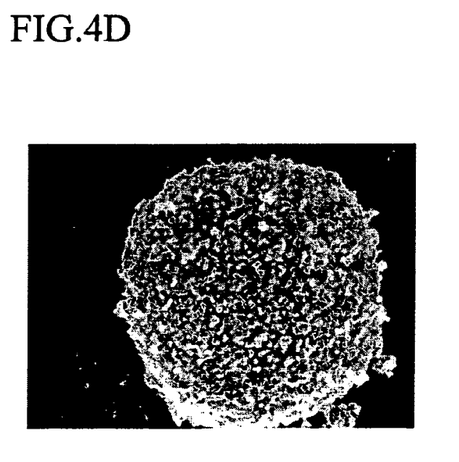
FIG. 4D is a Scanning Electron Microscope (SEM) photograph of a surface of the composite prepared according to Example 3.

FIG. 3A is a Scanning Electron Microscope (SEM) photograph showing the distribution of the conductive agent in the composite prepared according to Comparative Example 1. FIG. 3B is a Scanning Electron Microscope (SEM) photograph showing the distribution of the conductive agent in the composite prepared according to Comparative Example 2. As shown in FIGS. 3A and 3B, the Super P (Comparative Example 2) is more concentrated than the Ketjen black (comparative Example 1). Ketjen black has a good mixing property due to its high specific surface area and low tap density, while Super P has low specific surface area and high tap density. If the amount of Super P increases beyond certain amount, the active mass of the electrode increases and the specific surface area of the composite decreases. As a result, the reaction area decreases and the electrochemical properties deteriorate.

Accordingly, to improve electrochemical characteristics, the conductive agent having high specific surface area and low tap density such as Ketjen black and the conductive agent having low specific surface area and high tap density such as Super P, are mixed to a suitable ratio.

FIGS. 4A, 4B, 4C and 4D are Scanning Electron Microscope (SEM) photographs of the surfaces of the composites prepared according to Comparative Example 1, Example 1, Example 2 and Example 3 respectively. The composite prepared according to Comparative Example 1 includes only Ketjen black. Each of the composites prepared according to Examples 1, 2 and 3 comprise a mixture of Ketjen black and Super P.

As shown in FIGS. 4A, 4B, 4C and 4D, the surfaces of the composites prepared according to Example 1, 2 and 3, comprising a mixture of Ketjen black and Super P is rougher than the surface of the composite prepared according to Comparative Example 1, comprising only the Ketjen black. Also, the surfaces of the composites become rougher when the amount of conductive agent is increased. If the surface of the conductive layer is rough, the reaction surface increases and the area for incorporating the electrolyte also increases, thereby improving the electrochemical characteristics of the electrode. The area contacting the binder increases upon mixing the composition, thereby improving the binding property and increasing the active mass density.

Figure 5:
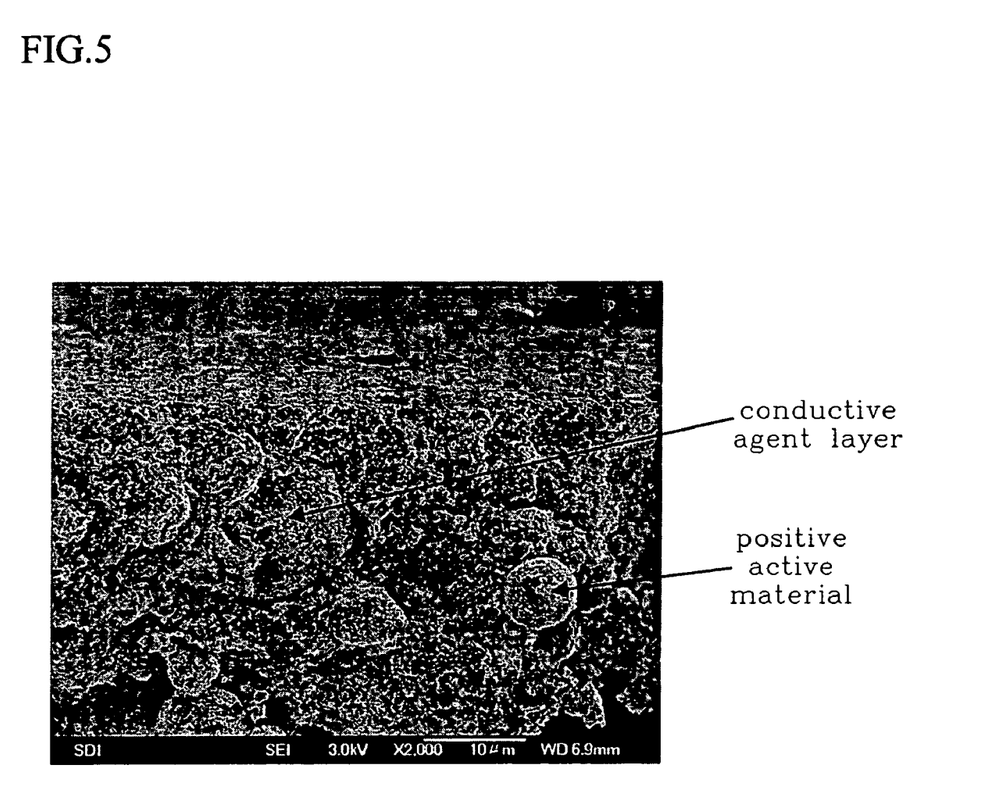
FIG. 5 is a Scanning Electron Microscope (SEM) photograph of a cross-section of the composite prepared according to Example 3.
Figure 6:
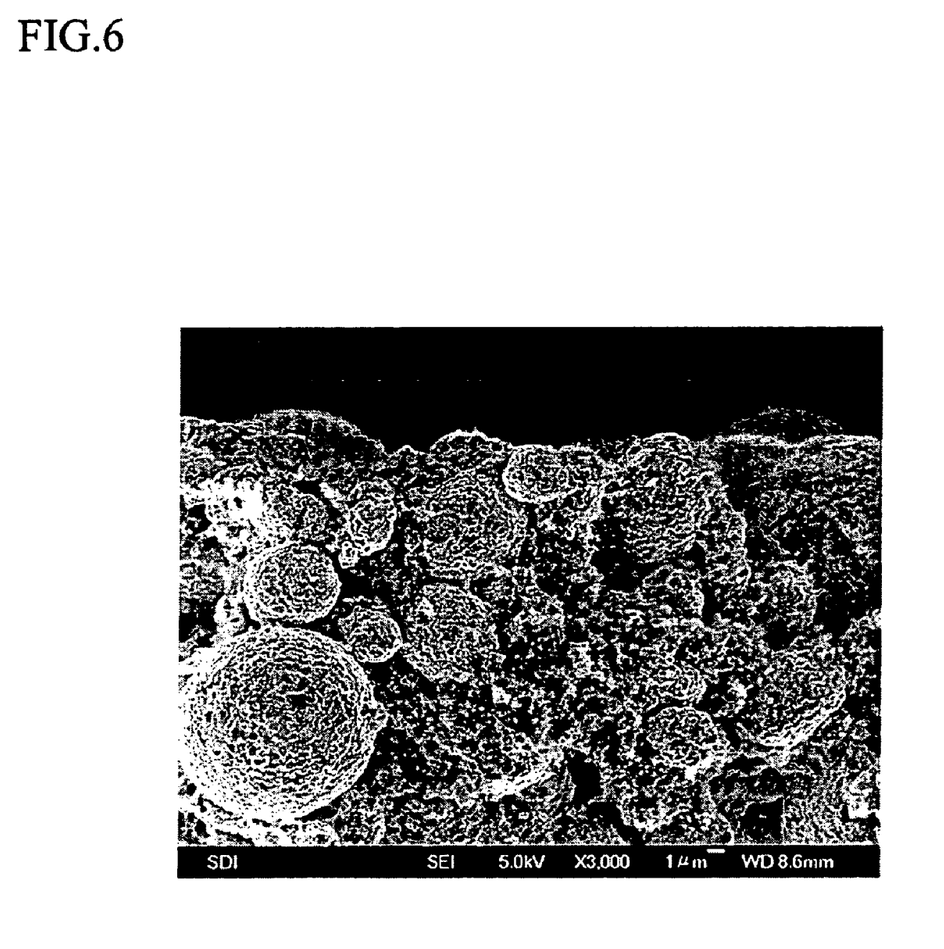
FIG. 6 is a Scanning Electron Microscope (SEM) photograph of a cross-section of the composite prepared according to Comparative Example 4.

FIGS. 5 and 6 are Scanning Electron Microscope (SEM) photographs of cross-sections of the composites prepared according to Example 3 and Comparative Example 4, respectively. As shown in FIGS. 5 and 6, the composite prepared according to Example 3, using two conductive agents mixed and coated by mechanofusion, has more conductive agent adjacent to the positive active material than the composite prepared according to Comparative Example 4, prepared by simply mixing two conductive agents with the positive active material.

The composites according to Comparative Example 1 and Examples 1 through 3 were subjected to particle size analysis (PSA). In addition, the specific surface area (BET) and tap density of each composite was measured. The results are shown in Table 1.

TABLE 1

| | PSA (μm) | | | BET | Tap density |
|---|---|---|---|---|---|
| | D10 | D50 | D90 | (m$^2$/g) | (g/cc) |
| Lithium nickel cobalt aluminum oxide (LiNi$_{0.81}$Co$_{0.15}$Al$_{0.04}$O$_2$) | 3.553 | 6.832 | 11.72 | 0.3763 | |
| composite of Comparative Example 1 | 2.017 | 6.164 | 10.99 | 43.72 | 2.40 |
| composite of Example 1 | 2.903 | 7.206 | 12.72 | 12.80 | 2.53 |
| composite of Example 2 | 4.141 | 8.268 | 14.28 | 41.11 | 2.19 |
| composite of Example 3 | 0.309 | 6.090 | 15.38 | 51.75 | 1.98 |

As shown in Table 1, the composite prepared according to Example 2 has the largest average particle size (D50). As such, the conductive layer on the active material of that composite has the greatest thickness. However, the composite prepared according to Example 3 has the largest maximum particle size (D90), and therefore, the conductive layer on the active material of that composite has the greatest maximum thickness. Further, there is a large difference between D10 and D90 in the composite prepared according to Example 3 because the control condition for the mechanofusion was not suitable, i.e. the thickness of the conductive layer formed on the active material was not uniform. In addition, because the composite prepared according to Example 3 has the largest specific surface area, it will have the best electrochemical reaction.

Figure 2A:
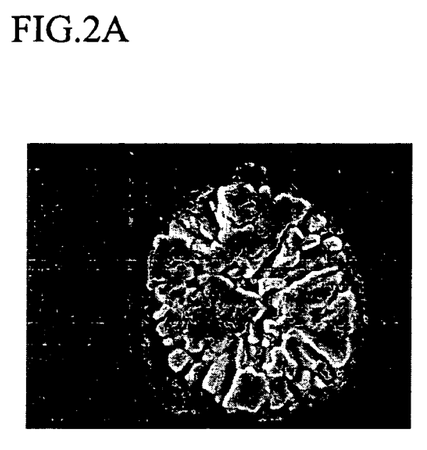
FIG. 2A is a Scanning Electron Microscope (SEM) photographs of a cross-section of a composite prepared according to Comparative Example 1.
Figure 2B:
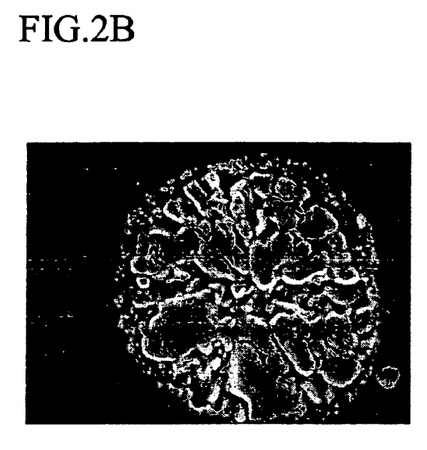
FIG. 2B is a Scanning Electron Microscope (SEM) photographs of a cross-section of a composite prepared according to Example 1.
Figure 2C:
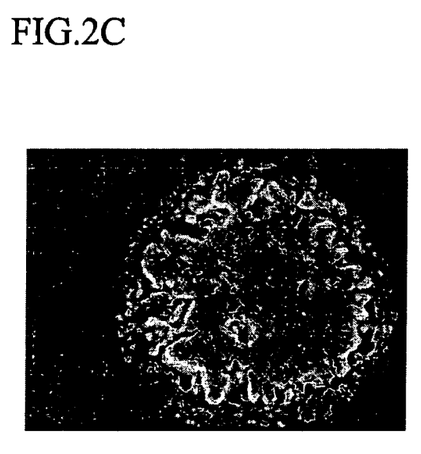
FIG. 2C is a Scanning Electron Microscope (SEM) photographs of a cross-section of a composite prepared according to Example 2.
Figure 2D:
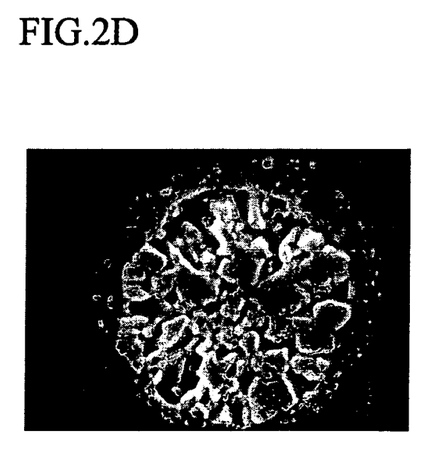
FIG. 2D is a Scanning Electron Microscope (SEM) photographs of a cross-section of a composite prepared according to Example 3.

As shown in FIG. 2D, the conductive layer of the composite prepared according to Example 3 has a variant thickness relative to the conductive layers of Comparative Example 1 and Examples 1 and 2. The composite prepared according to Example 3 has a minimum thickness more than 5 μm and a maximum thickness of up to 10 μm. These results show that mechanofusion is efficient.

However, Table 1 shows that the tap density of the composite prepared according to Example 3 is the lowest even though mechanofusion is the most efficient. This appears to be caused by the relatively low density of Ketjen black being uniformly distributed around the active material, thereby providing the largest specific surface area. A composite having low tap density can incorporate more electrolyte, and the greater specific surface area improves the overall electrochemical characteristics of the battery. Further, the composite prepared according to Example 3, comprising Ketjen black and Super P mixed at a 50:50 ratio, has low tap density and high specific surface area, demonstrating that mechanofusion is effective for composites uniformly mixed at a 50:50 ratio.

Fabricating Test Cell for Testing Charge and Discharge

Positive active materials prepared according to Examples 1 through 4 were mixed with polyvinylidene fluoride in N-methyl pyrrolidone to provide a positive electrode slurry. The ratio of positive active material to polyvinylidene fluoride was 90:10.

Further, positive active materials prepared according to Comparative Examples 1 through 3 were mixed with a conductive agent (Super-P, manufactured by MMM carbon Company) and polyvinylidene fluoride in N-methyl pyrrolidone to provide a positive electrode slurry. The ratio of positive active material to conductive agent to polyvinylidene fluoride was 80:10:10.

Each positive electrode slurries was coated on aluminum foil (Al-foil) to provide a thin electrode plate (40 to 50 μm, including the substrate thickness). The slurry was then dried at 135° C. for 3 hours or more, and pressed to provide a positive electrode plate.

Figure 7:
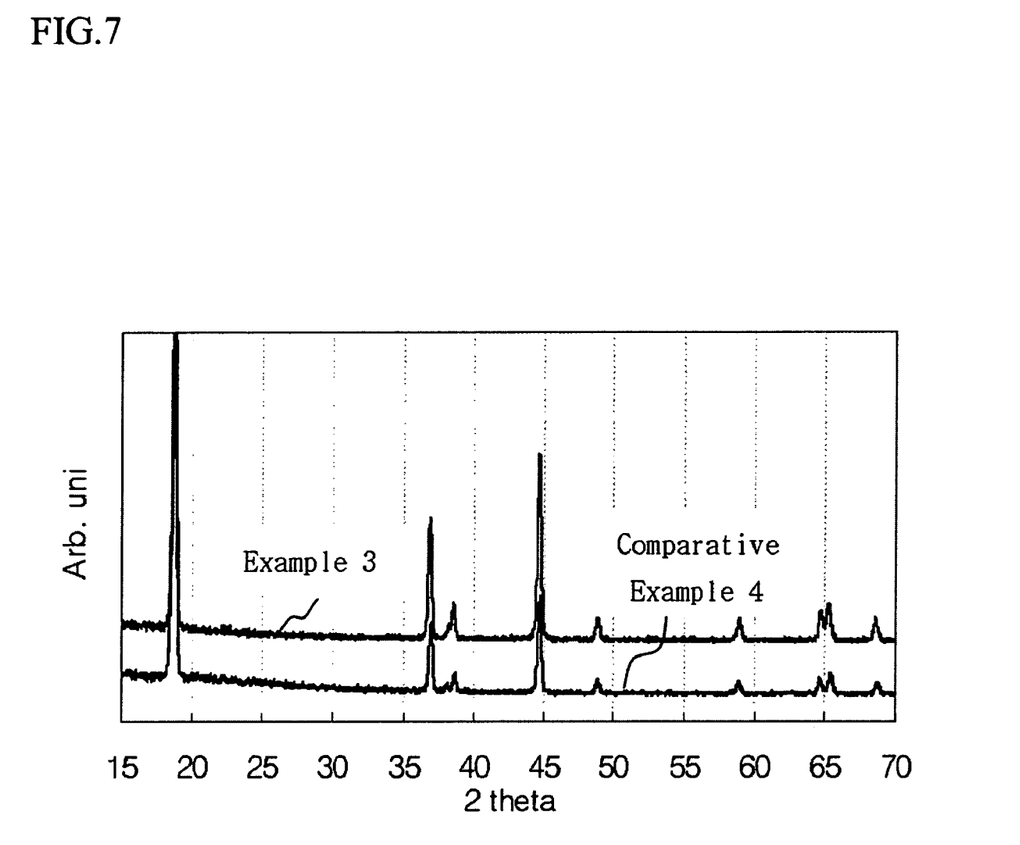
FIG. 7 is a graph of the X-ray diffraction patterns of the positive electrode plates of the composites prepared according to Example 3 and Comparative Example 4.

X-ray diffraction patterns were measured for the composites prepared according to Example 3 and Comparative Example 4. The results are shown in FIG. 7. As shown in FIG. 7, the positive electrode plate including the composite prepared according to Example 3 showed peaks at the same angles (2θ) as those of the composite prepared according to Comparative Example 4. This indicates that the material in the electrode including the composite prepared according to Example 3 is the same material as that of the electrode including the composite prepared according to Comparative Example 4. This confirms that the active material and conductive agent were not changed after mechanofusion.

A 2016 coin-type half cell was fabricated by arranging the positive electrode and a lithium metal counter electrode. A porous polypropylene separator was positioned between the positive and negative electrodes, and an electrolyte comprising LiPF$_6$ dissolved in a 1 M solution of ethylene carbonate, ethylmethyl carbonate, propylene carbonate, and fluorobenzene (volume ratio of 30:55:5:10) was injected into the half cell.

The cell was charged to 4.2 V and discharged to 3.0 V, and this charge-discharge cycle was repeated twice. The cell was then charged to 4.2V and AC impedance was measured while scanning 1 MHz to 10 MHz. The results are shown in FIG. 8.

Figure 8:
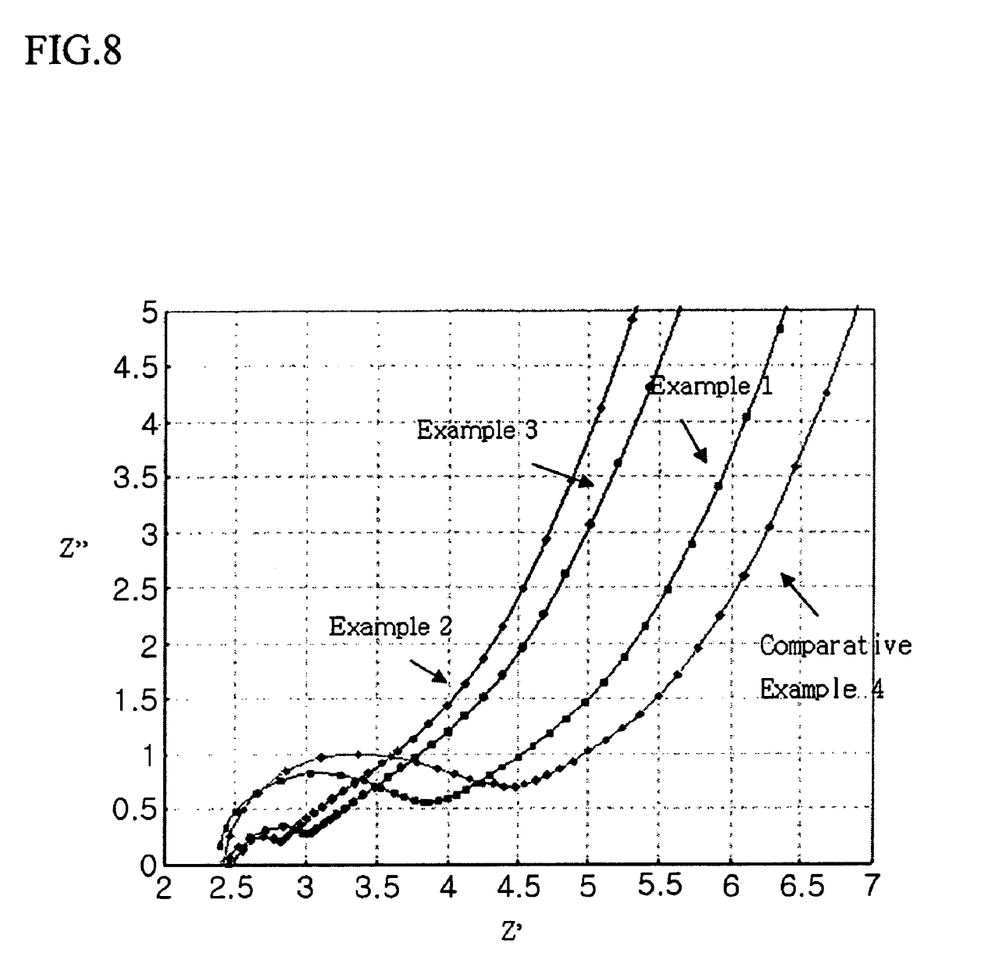
FIG. 8 is a graphical representation of the AC impedance measurement results of batteries including composites prepared according to Examples 1 to 3 and Comparative Example 4.

FIG. 8 is a graph representation of the AC impedance measurement results of the batteries fabricated with the composites prepared according to Examples 1 through 3 and Comparative Example 4. In FIG. 8, the x-axis value of a particular point on a line of the graph represents electrolyte resistance and the arc represents resistance from the transfer of electrons and ions to the active material.

As shown in FIG. 8, the resistance decreases as the amount of conductive agent having a large specific surface area, such as Ketjen black, increases. The conductive agent having a large specific surface area increases the contacting area with the active material. However, the resistance of the composite prepared according to Comparative Example 4 is greater than that of Example 1. This is caused by the distribution of the conductive agent and the contact between the active material and conductive agent. In the composite prepared according to Example 1, a sufficiently thick conductive layer was formed surrounding the active material, and the active material was well mixed with the conductive agent due to the improved dispersion of the conductive agent having a low tap density imparted by the mechanofusion. On the contrary, in the composite prepared according to Comparative Example 4, the active material did not smoothly contact the conductive agent, resulting in increased resistance even though Ketjen black has a high specific surface area and was present in a large amount.

The inventive composites use two conductive agents and a positive active material, making it unnecessary to add a further conductive agent to a slurry for fabricating an electrode plate, thereby conserving binder. In addition, the conductive layer contacts the nonconductive binder, minimizing the increase of electric resistance due to the binder. Therefore, the composites of the present invention provide positive electrodes having reduced resistance and higher active densities.

While the present invention has been described in detail with reference to exemplary embodiments, those skilled in the art will appreciate that various modifications and substitutions can be made to the described embodiments without departing from the spirit and scope of the present invention as set forth in the appended claims.

What is claimed is:

1. A conductive agent/positive active material composite for a lithium secondary battery, the composite comprising:
   a positive active material capable of reversibly intercalating/deintercalating lithium ions; and
   first and second conductive agents on a surface of the positive active material, wherein the first and second conductive agents are coated on the surface of the positive active material to a thickness ranging from about 7 to about 10 μm, wherein the first conductive agent has a specific surface area ranging from about 200 to about 1500 m$^2$/g and the second conductive agent has a specific surface area of about 100 m$^2$/g or less, and wherein the composite has a tap density ranging from about 0.5 to about 5 g/cc.

2. The conductive agent/positive active material composite according to claim 1, wherein the first conductive agent has a specific surface area ranging from about 700 to about 1200 m$^2$/g and the second conductive agent has a specific surface area ranging from about 40 to about 80 m$^2$/g.

3. The conductive agent/positive active material composite according to claim 1, wherein the first conductive agent has a tap density ranging from about 0.02 to about 0.1 g/cc, and the second conductive agent has a tap density ranging from about 0.1 to about 1 g/cc.

4. The conductive agent/positive active material composite according to claim 1, wherein the first conductive agent has a tap density ranging from about 0.05 to about 0.09 g/cc, and the second conductive agent has a tap density ranging from about 0.2 to about 0.5 g/cc.

5. The conductive agent/positive active material composite according to claim 1, wherein the first conductive agent is selected from the group consisting of Ketjen black, Vulcan black, carbon black, black pearl and mixtures thereof.

6. The conductive agent/positive active material composite according to claim 1, wherein the second conductive agent is selected from the group consisting of acetylene black, denka black, carbon black and mixtures thereof.

7. The conductive agent/positive active material composite according to claim 1, wherein a weight ratio of the first conductive agent to the second conductive agent ranges from about 25:75 to about 75:25.

8. The conductive agent/positive active material composite according to claim 1, wherein a weight ratio of the first conductive agent to the second conductive agent ranges from about 50:50 to about 60:40.

9. The conductive agent/positive active material composite according to claim 1, wherein the positive active material is selected from the group consisting of $LiNi_{1-x-y}Co_xM_yO_2$, wherein $0<x<1$, $0<y<1$, $0<x+y<1$, and M is a metal selected from Al, Sr, Mg and La, $LiCoO_2$, $LiNiO_2$, $LiMnO_2$, $LiMn_2O_4$, $LiFeO_2$, $V_2O_5$, and chalcogenide compounds thereof.

10. The conductive agent/positive active material composite according to claim 1, wherein a weight ratio of the first and second conductive agents to the positive active material ranges from about 3:97 to about 20:80.

11. The conductive agent/positive active material composite according to claim 1, wherein a weight ratio of the first and second conductive agents to the positive active material ranges from about 5:95 to about 15:85.

12. The conductive agent/positive active material composite according to claim 1, wherein the composite has a specific surface area ranging from about 10 to about 200 m$^2$/g.

13. The conductive agent/positive active material composite according to claim 1, wherein the composite has a specific surface area ranging from about 20 to about 200 m$^2$/g.

14. The conductive agent/positive active material composite according to claim 1, wherein the composite has a tap density ranging from about 1.5 to about 3 g/cc.

15. A method of preparing a conductive agent/positive active material composite for a lithium secondary battery, the method comprising:
   mixing a first conductive agent with a second conductive agent to form a conductive agent mixture; and
   coating the conductive agent mixture on a surface of a positive active material to a thickness ranging from about 7 to about 10 μm by mechanofusion, wherein the composite has a tap density ranging from about 0.5 to about 5 g/cc.

16. The method according to claim 15, wherein the first conductive agent has a specific surface area ranging from about 200 to about 1500 m$^2$/g and the second conductive agent has a specific surface area of about 100 m$^2$/g or less.

17. The method according to claim 15, wherein the first conductive agent has a tap density from about 0.02 to about 0.1 g/cc, and the second conductive agent has a tap density ranging from about 0.1 to about 1 g/cc.

18. The method according to claim 15, wherein the first conductive agent is selected from the group consisting of Ketjen black, Vulcan black, carbon black, black pearl and mixtures thereof.

19. The method according to claim 15, wherein the second conductive agent is selected from the group consisting of acetylene black, denka black, carbon black and mixtures thereof.

20. The method according to claim 15, wherein a weight ratio of the first conductive agent to the second conductive agent ranges from about 25:75 to about 75:25.

21. The method according to claim 15, wherein the positive active material is selected from the group consisting of $LiNi_{1-x-y}Co_xM_yO_2$, wherein $0<x<1$, $0<y<1$, $0<x+y<1$, and M is a metal selected from Al, Sr, Mg and La, $LiCoO_2$, $LiNiO_2$, $LiMnO_2$, $LiMn_2O_4$, $LiFeO_2$, $V_2O_5$, and chalcogenide compounds thereof.

22. The method according to claim 15, wherein a weight ratio of the first and second conductive agents and the positive active material ranges from about 3:97 to about 20:80.

23. A positive electrode for a lithium secondary battery, the positive electrode comprising:
a conductive agent/positive active material composite comprising a positive active material capable of reversibly intercalating/deintercalating lithium ions and first and second conductive agents on a surface of the positive active material, wherein the first and second conductive agents are coated on the surface of the positive active material to a thickness ranging from about 7 to about 10 μm, and wherein the composite has a tap density ranging from about 0.5 to about 5 g/cc; and
a binder,
wherein the first conductive agent has a specific surface area ranging from about 200 to about 1500 m²/g and the second conductive agent has a specific surface area of about 100 m²/g or less.

24. The positive electrode according to claim 23, wherein the first conductive agent has a specific surface area ranging from about 700 to about 1200 m²/g and the second conductive agent has a specific surface area ranging from about 40 to about 80 m²/g.

25. The positive electrode according to claim 23, wherein the first conductive agent has a tap density ranging from about 0.02 to about 0.1 g/cc, and the second conductive agent has a tap density ranging from about 0.1 to about 1 g/cc.

26. The positive electrode according to claim 23, wherein the first conductive agent has a tap density ranging from about 0.05 to about 0.09 g/cc, and the second conductive agent has a tap density ranging from about 0.2 to about 0.5 g/cc.

27. The positive electrode according to claim 23, wherein the first conductive agent is selected from the group consisting of Ketjen black, Vulcan black, carbon black, black pearl and mixtures thereof.

28. The positive electrode according to claim 23, wherein the second conductive agent is selected from the group consisting of acetylene black, denka black, carbon black and mixtures thereof.

29. The positive electrode according to claim 23, wherein a weight ratio of the first conductive agent to the second conductive agent ranges from about 25:75 to about 75:25.

30. The positive electrode according to claim 23, wherein the positive active material is selected from the group consisting of $LiNi_{1-x-y}Co_xM_yO_2$, wherein $0<x<1$, $0<y<1$, $0<x+y<1$, and M is a metal selected from Al, Sr, Mg and La, $LiCoO_2$, $LiNiO_2$, $LiMnO_2$, $LiMn_2O_4$, $LiFeO_2$, $V_2O_5$, and chalcogenide compounds thereof.

31. The positive electrode according to claim 23, wherein a weight ratio of the first and second conductive agents to the positive active material ranges from about 3:97 to about 20:80.

32. The positive electrode according to claim 23, wherein a weight ratio of the first and second conductive agents to the positive active material ranges from about 5:95 to about 15:85.

33. The positive electrode according to claim 23, wherein the composite has a specific surface area ranging from about 20 to about 200 m²/g.

34. The positive electrode according to claim 23, wherein a weight ratio of the composite to the binder ranges from about 98:2 to about 90:10.

35. The positive electrode according to claim 23, wherein the electrode has an active mass density ranging from about 1.0 to about 2.4 g/cc.

36. A lithium secondary battery comprising:
the positive electrode for a lithium secondary battery according to claim 23;
a negative electrode comprising a negative active material capable of intercalating and deintercalating lithium ions; and
an electrolyte.

37. A device comprising:
a motor; and
the lithium secondary battery of claim 36, wherein the lithium secondary battery is configured to drive the motor.

* * * * *